US007214294B2

(12) United States Patent
Bement et al.

(10) Patent No.: US 7,214,294 B2
(45) Date of Patent: May 8, 2007

(54) AZEOTROPE-LIKE COMPOSITIONS OF PENTAFLUOROPROPANE AND WATER

(75) Inventors: Leslie Bruce Bement, Erie County, NY (US); Mary Charlotte Bogdan, Erie County, NY (US); Clayton Herbert Carson, Erie County, NY (US); Peter Brian Logsdon, Erie County, NY (US); Hang Thanh Pham, Erie County, NY (US); Rajiv Ratna Singh, Erie County, NY (US); Hsueh Sung Tung, Erie County, NY (US); Ronald Riegal, Erie County, NY (US); David John Williams, Erie County, NY (US); Kevin Donald Uhrich, Erie County, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/942,506

(22) Filed: Sep. 16, 2004

(65) Prior Publication Data

US 2005/0054743 A1 Mar. 10, 2005

Related U.S. Application Data

(62) Division of application No. 10/713,710, filed on Nov. 14, 2003, now Pat. No. 6,843,934, which is a division of application No. 09/575,399, filed on Oct. 2, 2000, now Pat. No. 6,689,822, and a division of application No. 09/268,000, filed on Mar. 15, 1999, now Pat. No. 6,514,928.

(51) Int. Cl.
*B01D 3/00* (2006.01)

(52) U.S. Cl. .................... 203/99; 203/14; 252/182.24; 252/364; 510/177; 510/415; 516/9; 516/10; 516/12; 516/20; 516/31; 521/131; 521/170; 521/174; 570/123

(58) Field of Classification Search ................. 203/14, 203/99; 570/123; 510/177, 415; 521/131, 521/170, 174; 252/182.24, 364; 516/9, 516/10, 12, 20, 31

See application file for complete search history.

(56) References Cited

U.S. PATENT DOCUMENTS

| | | | | |
|---|---|---|---|---|
| 2,834,748 A | | 5/1958 | Bailey | 260/42 |
| 2,846,458 A | | 8/1958 | Haluska | 260/448.2 |
| 2,917,480 A | | 12/1959 | Bailey | 260/42 |
| 3,284,347 A | * | 11/1966 | Hutton et al. | 208/333 |
| 5,391,317 A | | 2/1995 | Smits | 521/131 |
| 5,496,866 A | | 3/1996 | Sommerfield | 521/131 |
| 5,646,196 A | | 7/1997 | Sommerfield | 521/131 |
| 5,672,294 A | | 9/1997 | Lund et al. | 252/67 |
| 5,677,358 A | | 10/1997 | Lund et al. | 521/131 |
| 5,716,541 A | | 2/1998 | Werner et al. | 252/67 |
| 5,759,438 A | | 6/1998 | Lund et al. | 510/415 |
| 5,786,405 A | | 7/1998 | Schilling et al. | 521/117 |
| 5,840,212 A | | 11/1998 | Doerge | 252/350 |
| 5,866,029 A | | 2/1999 | Lund | 252/67 |
| 5,883,142 A | | 3/1999 | Chojnacki et al. | 521/112 |
| 5,889,066 A | | 3/1999 | Doerge | 521/114 |
| 5,895,793 A | | 4/1999 | Kitamura et al. | 521/131 |
| 6,101,818 A | * | 8/2000 | Thomas et al. | 62/85 |
| 6,111,150 A | * | 8/2000 | Sakyu et al. | 570/167 |
| 6,514,928 B1 | * | 2/2003 | Bement et al. | 510/415 |
| 6,689,822 B1 | * | 2/2004 | Bement et al. | 521/170 |
| 6,843,934 B2 | * | 1/2005 | Bement et al. | 252/182.24 |

FOREIGN PATENT DOCUMENTS

| | | |
|---|---|---|
| EP | 0882760 | 3/1998 |
| JP | 10-226718 | 8/1998 |
| WO | WO 98/00379 | 8/1998 |

* cited by examiner

*Primary Examiner*—John M. Cooney, Jr.
(74) *Attorney, Agent, or Firm*—Colleen D. Szuch

(57) ABSTRACT

This invention provides azeotrope-like compositions of 1,1,1,3,3-pentafluoropropane and water that are environmentally desirable for use as refrigerants, aerosol propellants, metered dose inhalers, blowing agents for polymer foam, heat transfer media, and gaseous dielectrics.

20 Claims, 1 Drawing Sheet

AZEOTROPE-LIKE COMPOSITIONS OF PENTAFLUOROPROPANE AND WATER

CROSS REFERENCE TO RELATED APPLICATIONS

This application is a division of U.S. patent application Ser. No. 10/713,710 filed Nov. 14, 2003 now U.S. Pat. No. 6,843,934 which was a division of U.S. patent application Ser. No. 09/575,399 filed Oct. 2, 2000, now U.S. Pat. No. 6,689,822; and a division of U.S. patent application Ser. No. 09/268,000 filed Mar. 15, 1999 now U.S. Pat. No. 6,514,928 all of which are incorporated herein by reference.

FIELD OF THE INVENTION

The present invention relates to azeotrope-like compositions of 1,1,1,3,3-pentafluoropropane ("HFC-245fa") and water ("$H_2O$"). More particularly, the invention provides compositions of HFC-245fa and water that are environmentally desirable for use as refrigerants, in centrifugal chillers, aerosol propellants, metered dose inhalers, fire extinguishers, blowing agents for polymer foam, heat transfer media, solvents, and gaseous dielectrics.

BACKGROUND OF THE INVENTION

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, especially chlorofluorocarbons ("CFC's"), it is desirable to use fluids of lesser ozone depletion potential such as hydrofluorocarbons, ("HFC's") and/or bydrochlorofluorocarbons ("HCFC's).

Thus, the use of fluids that do not contain CFC's or contain HCFC's or HFC's instead of CFC's is desirable. Additionally, it is known that the use of single component fluids or azeotropic mixtures, which mixtures do not fractionate on boiling and evaporation, is preferred. However, the identification of new, environmentally safe, azeotropic mixtures is complicated due to the fact that it is difficult to predict azeotrope formation.

The art continually is seeking new fluorocarbon based mixtures that offer alternatives, and are considered environmentally safer substitutes for CFC's and HCFC's. Of particular interest are mixtures containing a hydrofluorocarbon and a non-fluorocarbon, both of low ozone depletion potentials. Such mixtures are the subject of this invention.

DESCRIPTION OF THE INVENTION AND PREFERRED EMBODIMENTS

This invention provides azeotrope-like compositions of HFC-245fa and water. The compositions of the invention provide environmentally desirable replacements for currently used CFC's and HCFC's since HFC-245fa and water have zero ozone depletion potentials. Additionally, the compositions of the invention exhibit characteristics that make the compositions better CFC and HCFC substitutes than either HFC-245fa or water alone.

Accordingly, the invention provides azeotrope-like compositions comprising effective amounts of HFC-245fa and water. By "effective amounts" is meant the amount of each component that, on combination with the other component, results in the formation of an azeotrope-like composition.

More specifically, the invention provides azeotrope-like compositions consisting essentially of HFC-245fa and water, which compositions have a boiling point of 14° C.±2 preferably ±1° C., at 760 mm Hg pressure. The preferred, more preferred, and most preferred compositions of the invention are set forth in Table 1. The numerical ranges in Table 1 are to be understood to be prefaced by the term "about".

TABLE 1

| Components | Preferred (wt %) | More Preferred (wt %) | Most Preferred (wt %) |
|---|---|---|---|
| HFC-245fa | 65–99 | 75–98 | 83–97 |
| Water | 35–1 | 25–2 | 17–3 |

The invention further provides a method of preparing polyurethane and polyisocyanurate foam compositions comprising the step of reacting and foaming a mixture of ingredients which react to form polyurethane or polyisocyanurate foams in the presence of a blowing agent comprising and azeotrope-like composition consisting essentially of 1,1,3,3-pentafluoropropane and water, preferably from about 65 to about 99 weight percent HFC-245fa and from about 35 to about 1 weight percent water; more preferably from about 75 to about 98 weight percent BFC-245fa and from about 25 to about 2 weight percent water; and most preferably from about 3 to about 17 weight percent water.

In another embodiment of the invention, there is provided a blowing agent composition comprising an azeotrope-like composition consisting essentially of HFC-245fa and water. In one embodiment the invention provides a blowing agent composition comprising an azeotrope-like composition consisting essentially of HFC-245fa and water, preferably from about 65 to about 99 weight percent HFC-245fa and from about 35 to about 1 weight percent water; more preferably from about 75 to about 98 weight percent HFC-245fa and from about 25 to about 2 weight percent water; and most preferably from about 3 to about 17 weight percent water.

The invention further relates to a closed cell foam prepared from a polymer foam formulation containing a blowing agent comprising and azeotrope-like composition consisting essentially of 1,1,1,3,3-pentafluoropropane and water. In one embodiment, the invention provides a closed cell foam prepared from a polymer foam formulation containing a blowing agent comprising an azeotrope-like composition consisting essentially of HFC-245fa and water, preferably from about 65 to about 99 weight percent HFC-245fa and from about 35 to about 1 weight percent water; more preferably from about 75 to about 98 weight percent HFC-245fa and from about 25 to about 2 weight percent water; and most preferably from about 3 to about 17 weight percent water.

In another embodiment, the invention provides a closed cell foam containing a cell gas comprising a blowing agent comprising an azeotrope-like composition consisting essentially of 1,1,1,3,3-pentafluoropropane and water, preferably from about 65 to about 99 weight percent HFC-245fa and from about 35 to about 1 weight percent water; more preferably from about 75 to about 98 weight percent HFC-245fa and from about 25 to about 2 weight percent water; and most preferably from about 3 to about 17 weight percent water.

For purposes of this invention, azeotrope-like compositions are compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

Azeotrope-like compositions behave like azeotropic mixtures, i.e., are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a nonazeotropic mixture into its separate components. If the mixture containing the additional component is nonazeotropic or nonazeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like, or constant boiling. All such compositions are intended to be covered by the terms "azeotrope-like" and "constant boiling". As an example, it is well known that at differing pressures, the composition of a given azeotrope will vary at least slightly as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

The compositions of the invention meet the need in the art for HFC mixtures that have no ozone depletion potential and are negligible contributors to greenhouse global warming and are nonflammable. Further, because the azeotrope-like compositions of the invention exhibit constant vapor pressure characteristics and relatively minor composition shifts as the liquid mixture is evaporated, the azeotrope-like compositions of the invention are comparable to a constant boiling single component composition.

In a process embodiment, the compositions of the invention are used in a method for producing polyurethane and polyisocyanurate foams. Any of the methods well known in the art such as those described in "Polyurethanes Chemistry and Technology," Volumes I and II, Saunders and Frisch, 1962, John Wiley and Sons, New York, N.Y. In general, the method comprises preparing polyurethane or polyisocyanurate foams by combining an isocyanate, a polyol or mixture of polyols, a blowing agent or mixture of blowing agents, and other materials such as catalysts, surfactants, and optionally, flame retardants, colorants, or other additives. The blowing agent or agents employed shall be a volatile mixture of the azeotrope-like compositions of the present invention.

It is convenient in many applications to provide the components for polyurethane or polyisocyanurate foams in preblended formulations. Most typically, the foam formulation is preblended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B component as described above.

It is also possible to produce thermoplastic foams using the compositions of the invention. For example, conventional foam polyurethanes and isocyanurate formulations may be combined with the azeotrope-like compositions in a conventional manner to produce rigid foams.

Azeotrope-like mixtures containing HFC-245fa are particularly suitable as foam blowing agents since foams blown with BFC-245fa have been found to possess low relative initial and aged thermal conductivity and good dimensional stability at low temperatures. Of particular interest are those mixtures that contain HFC-245fa and other zero ozone depleting materials, such as, for example, other hydrofluorocarbons, e.g., difluoromethane (HFC-32), difluoroethane (HFC-152), trifluoroethane (HFC-143), tetrafluoroethane (HFC-134), pentafluoropropane (HFC-245), hexafluoropropane (HFC-236), heptafluoropropane (HFC-227); $C_4$–$C_7$ hydrocarbons, including but not limited to butane, isobutane, n-pentane, isopentane, cyclopentane, hexane and isohexane; and inert gases, e.g., air, nitrogen, carbon dioxide. Where isomerism is possible for the hydrofluorocarbons mentioned above, the respective isomers may be used either singly or in the form of a mixture.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458. Other optional additives for the blowing agent mixture may include flame retardants such as tris(2-chloroethyl)phosphate, tris(2-chloropropyl)phosphate, tris(2,3-dibromopropyl)-phosphate, tris(1,3-dichloropropyl)

phosphate, diammonium phosphate, various halogenated aromatic compounds, antimony oxide, aluminum trihydrate, polyvinyl chloride, and the like.

Generally speaking, the amount of blowing agent present in the blended mixture is dictated by the desired foam densities of the final polyurethane or polyisocyanurate foams products. The proportions in parts by weight of the total blowing agent or blowing agent blend can fall within the range of from 1 to about 60 parts of blowing agent per 100 parts of polyol. Preferably from about 10 to about 35 parts by weight of HFC-245fa per 100 parts by weight of polyol are used.

In another embodiment, the mixtures and compositions of this invention may be used as propellants in sprayable compositions, either alone or in combination with known propellants. The sprayable composition comprises, consists essentially of, and consists of a material to be sprayed and a propellant comprising, consisting essentially of, and consisting of a mixture or composition of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

In another process embodiment, a process for removing water from 1,1,1,3,3-pentafluoropropane is provided, which process comprises the step of distilling a mixture of 1,1,1,3,3-pentafluoropropane and water to separate an azeotrope or azeotrope-like composition consisting essentially of HFC-245fa and water from HFC-245fa present in excess of the concentration of said azeotrope. (It is to be noted that the composition of the true azeotrope has not been determined). Thus, an HFC-245fa/water azeotrope can be used to remove bulk amounts of water in a HFC-245fa manufacturing process. In a commercial process, trace amounts of acidic components in HFC-245fa may be removed by water wash. After water washing, the HFC-245fa layer is phase-separated. Accordingly, in another embodiment of the invention, a process is provided in which a mixture of 1,1,1,3,3-pentafluoropropane and water is phase separated to remove bulk amounts of water before conducting said distillation step. Residual amounts of water in the HFC-245fa phase can be distilled out because of the existence of the HFC-245fa/water azeotrope. Subsequent distillation or multiple distillations can be used to remove trace amounts of water along with other impurities to achieve the desired purity. Alternatively, water in the wet 245fa can be removed by using a combination of distillation and drying media, such as molecular sieve, silica alumina and the like.

The components of the composition of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

The present invention is more fully illustrated by the following, non-limiting examples.

EXAMPLES

Example 1

An ebulliometer consisting of vacuum-jacketed tube with a condenser on top was used. About 20 g HFC-245fa were charged to the ebulliometer and water was added in small, measured increments. The temperature was measured using a platinum resistance thermometer. When water is added in amount up to about 2 weight percent, the boiling point of the composition changed by only 0.3° C. From 2 weight percent water to about 70 weight percent water the temperature changed by less than 0.1° C. Therefore, the composition boils as a constant-boiling composition over this range.

Example 2

100 g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of the azeotrope-like composition of Example 1 as blowing agent. The resulting mixture is foamed with 152 g of crude 4,4' diisocyanato-diphenylmethane. The resulting rigid foam is inspected and found to be of good quality.

Example 3

In this example, shows that foams prepared using the azeotrope-like compositions described in this invention as a foam blowing agent exhibits improved k-factors. In general the formulations used to prepare these foams are described in Table 2.

TABLE 2

| Component (pbw) | | | | | |
|---|---|---|---|---|---|
| Terate 2541[1] | 100.00 | 100.00 | 100.00 | 100.00 | 100.00 |
| Tegostab B8433[2] | 2.00 | 2.00 | 2.00 | 2.00 | 2.00 |
| Polycat 8[3] | 0.25 | 0.50 | 0.63 | 0.63 | 1.30 |
| Dabco K-15[3] | 2.80 | 3.80 | 5.60 | 6.50 | 5.80 |
| Water | 0.00 | 1.70 | 2.75 | 3.50 | 5.10 |
| HFC-245fa | 38.00 | 25.50 | 20.50 | 17.30 | 0.00 |
| Lupranate M70L[4] | 150.10 | 215.60 | 258.70 | 307.00 | 342.70 |
| Index | 250 | 250 | 250 | 250 | 250 |

[1]Polyol from COSA; hydroxyl number = 240
[2]Surfactant from Goldschmidt Chemical Company
[3]Catalyst from Air Products & Chemicals Inc.
[4]A Polymethylene poly(phenyl isocyanate) mixture containing about 40% by weight of methylenebis(phenyl isocyanate) with the balance being polymethylene poly(phenyl isocyanate) having a functionality greater than 2; ic = socyanate equivalent weight = about 134; from BASF Corp.

The same general procedure commonly referred to as "handmixing" was used to prepare all foams. For each blowing agent or blowing agent pair, a premix of polyol, Terate 2541, surfactant, Tegostab B8433, and catalyst, Dabco K-15 and Polycat 8, was prepared in the same proportions displayed in Table 2. About 2 kg was blended to insure that all of the foams in a given series were made with the same master batch of premix. The premix was blended in a one-gallon paint can, and stirred at about 1500 rpm with a Conn 2" diameter ITC mixer until a homogenous blend was achieved. When mixing was complete the material was transferred to a one-gallon glass bottle and sealed. The bottle was then placed in a refrigerator controlled at 32° F. The foam blowing agents were kept separately in the same refrigerator, along with the 32 oz. tin cans used for mixing vessels. The A-component, isocyanate, was kept in sealed containers at 70° F.

For the individual foam preparations, an amount of B-component equal to the formulation weight was weighted into a 32 oz. tin can preconditioned at 32° F. To this was added the required amounts of the individual blowing agents, also preconditioned to 32° F. The contents were stirred for two-minutes with a Conn 2" ITC mixing blade turning at about 1000 rpm. Following this, the mixing vessel and contents were reweighed. If there was a weight loss, the lower boiling blowing agent was added to make up the loss. The contents were stirred for an additional 30 seconds, and the can replaced in the refrigerator.

After the contents had cooled again to 32° F., approximately 10 minutes, the mixing vessel was removed from the refrigerator and taken to the mixing station. A pre-weighed portion of A-component, isocyanate, was added quickly to the B-component, the ingredients mixed for 10 seconds using a Conn 2" diameter ITC mixing blade at 3000 rpm and poured into a 8"×8"×4" cardboard cake box and allowed to rise. Cream, initiation, gel and tack free times were recorded for the individual polyurethane foam samples.

The foams were allowed to cure in the boxes at room temperature for at least 24 hours. After curing, the blocks were trimmed to a uniform size and densities measured. Any foams that did not meet the density specification 2.0+0.1 lb/ft$^3$ were discarded, and new foams prepared using an adjusted amount of blowing agent in the formulation to obtain the specified density.

BRIEF DESCRIPTION OF THE DRAWING

After ensuring that all the foams met the density specifications, the foams were tested for k-factor according to ASTM C518. The k-factor results are displayed in FIG. 1.

In the example, it can be seen that by using the azeotrope-like blends of HFC-245fa and water as the foam blowing agent instead of a high concentration of water alone the k-factors of the foams dramatically improve, as lower k-factors are desired for the insulating foams. The improvement is unexpectedly non-linear. The k-factors worsen dramatically at 245fa concentration lower than 85 wt. % (50 mole % 245fa), reaching values even worse than pure water. The best k-factors were obtained for 85–99 wt. % 245fa mixtures with water.

Figure 1:
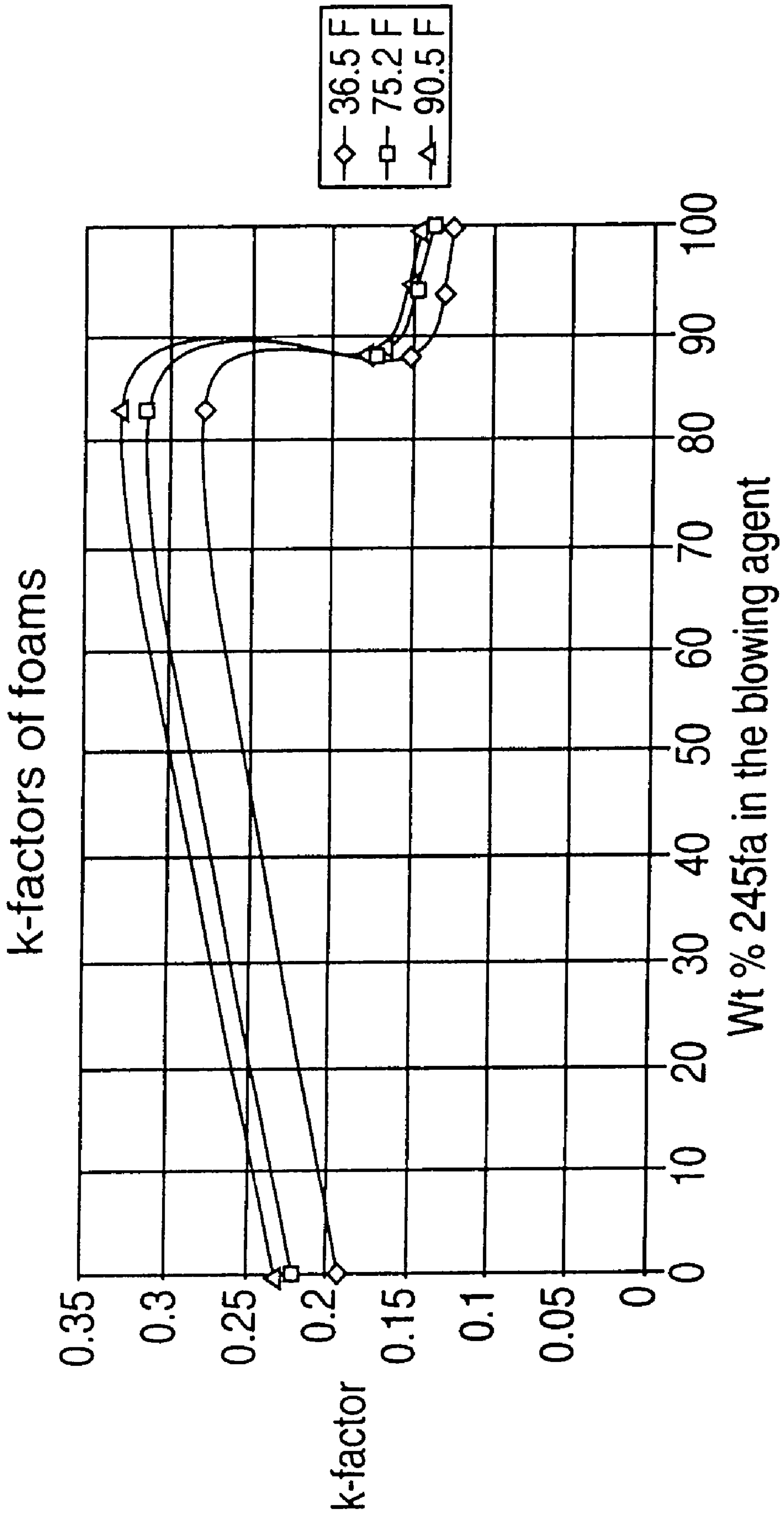

What is claimed is:

1. A process for removing water from 1,1,1,3,3-pentafluoropropane which process comprises distilling a mixture of 1,1,1,3,3-pentafluoropropane and water containing 1,1,1,3,3-pentafluoropropane in excess of the concentration necessary for the mixture of 1,1,1,3,3-pentafluoropropane and water to exist as an azeotrope or azeotrope-like composition to separate an azeotrope or azeotrope-like composition consisting essentially of 1,1,1,3,3-pentafluoropropane and water from the 1,1,1,3,3-pentafluoropropane present in excess of die concentration necessary for the mixture of 1,1,1,3,3-pentafluoropropane and water to exist as an azeotrope or azeotrope-like composition.

2. A process as described in claim 1 wherein said mixture of 1,1,1,3,3-pentafluoropropane and water is phase separated to remove bulk amounts of water before conducting said distillation step.

3. The process of claim 1 wherein water is removed from 1,1,1,3,3-pentafluoropropane by a combination of distilling and drying media.

4. The process of claim 3 wherein the drying media comprises at least one of molecular sieve and silica alumina.

5. The process of claim 1 wherein the azeotrope or azeotrope-like composition consists essentially of 1,1,1,3,3-pentafluoropropane and water, which compositions have a boiling point of 14° C. ±2° C. at 760 mm Hg pressure.

6. The process of claim 1 wherein the azeotrope or azeotrope-like composition consists essentially of 1,1,1,3,3-pentafluoropropane and water, which compositions have a boiling point of 14° C.±1° C. at 760 mm Hg pressure.

7. The process of claim 1 wherein the azeotrope or azeotrope-like composition consists essentially of from about 65 weight % to about 99 weight % of 1,1,1,3,3-pentafluoropropane and from about 35 weight % to about 1 weight % of water.

8. The process of claim 1 wherein the azeotrope or azeotrope-like composition consists essentially of from about 75 weight % to about 98 weight % of 1,1,1,3,3-pentafluoropropane and from about 25 weight % to about 2 weight % of water.

9. The process of claim 1 wherein the azeotrope or azeotrope-like composition consists essentially of from about 83 weight % to about 97 weight % of 1,1,1,3,3-pentafluoropropane and from about 17 weight % to about 3 weight % of water.

10. The process of claim 1 further comprising the subsequent step of conducting one or more additional distillations to remove trace amounts of water and other impurities from the azeotrope or azeotrope-like composition consisting essentially of 1,1,1,3,3-pentafluoropropane and water.

11. A process for removing water from 1,1,1,3,3-pentafluoropropane which process comprises first phase separating a mixture of 1,1,1,3,3-pentafluoropropane and water to remove bulk amounts of water and then distilling a resulting mixture of 1,1,1,3,3-pentafluoropropane and water containing 1,1,1,3,3-pentafluoropropane in excess of the concentration necessary for the mixture of 1,1,1.3,3-pentafluoropropane and water to exist as an azeotrope or azeotrope-like composition to separate an azeotrope or azeotrope-like composition consisting essentially of 1,1,1,3,3-pentafluoropropane and water from the 1,1,1,3,3-pentafluoropropane present in excess of the concentration necessary for the mixture of 1,1,1,3,3-pentafluoropropane and water to exist as an azeotrope or azeotrope-like composition.

12. The process of claim 11 further comprising the step of removing trace amounts of acidic components by a water wash before the phase separating step.

13. The process of claim 11 wherein water is removed from 1,1,1,3,3-pentafluoropropane by a combination of distilling and drying media.

14. The process of claim 13 wherein the drying media comprises at least one of molecular sieve and silica alumina.

15. The process of claim 11 Therein the azeotrope or azeotrope-like like composition consists essentially of 1,1,1,3,3-pentafluoropropane and water, which compositions have a boiling point of 14° C.±2° C. at 760 mm Hg pressure.

16. The process of claim 11 wherein the azeotrope or azeotrope-like composition consists essentially of 1,1,1,3,3-pentafluoropropane and water, which compositions have a boiling point of 14° C.±1° C. at 760 mm Hg pressure.

17. The process of claim 11 wherein the azeotrope or azeotrope-like composition consists essentially of from about 65 weight % to about 99 weight % of 1,1,1,3,3-pentafluoropropane and from about 35 weight % to about 1 weight % of water.

18. The process of claim 11 wherein the azeotrope or azeotrope-like composition consists essentially of from about 75 weight % to about 98 weight % of 1,1,1,3,3-pentafluoropropane and from about 25 weight % to about 2 weight % of water.

19. The process of claim 11 wherein the azeotrope or azeotrope-like like composition consists essentially of from about 83 weight % to about 97 weight % of 1,1,1,3,3-pentafluoropropane and from about 17 weight % to about 3 weight % of water.

20. The process of claim 11 further comprising the subsequent step of conducting one or more additional distillations to remove trace amounts of water and other impurities from the azeotrope or azeotrope-like composition consisting essentially of 1,1,1,3,3-pentafluoropropane and water.

* * * * *